United States Patent [19]

Benoit et al.

[11] 4,239,507

[45] Dec. 16, 1980

[54] METHOD OF SEPARATION OF A GAS FROM A GAS MIXTURE

[76] Inventors: Robert Benoit, 3 rue de Moscou, 91300 Massy; Jacques Machefer, 46 rue Vital, 75016 Paris; Jacques Mauvisseau, 45 rue Ribéra, 75016 Paris; Pierre Plurien, 37 Parc d'Ardenay, 91120 Palaiseau, all of France

[21] Appl. No.: 946,357

[22] Filed: Sep. 27, 1978

[30] Foreign Application Priority Data

Oct. 6, 1977 [FR] France .................. 77 30069

[51] Int. Cl.$^2$ .................. B01D 59/12
[52] U.S. Cl. .................. 55/16; 55/158
[58] Field of Search .................. 55/16, 158; 210/22, 210/321 R

[56] References Cited

U.S. PATENT DOCUMENTS

| | | | |
|---|---|---|---|
| 2,980,532 | 4/1961 | Martensson et al. | 55/16 X |
| 3,203,086 | 8/1965 | Eyraud et al. | 55/16 X |
| 3,420,069 | 1/1969 | Booth | 55/16 X |
| 3,614,855 | 10/1971 | Van Luik, Jr. | 55/16 |
| 3,651,618 | 3/1972 | Klein et al. | 55/16 |

FOREIGN PATENT DOCUMENTS

| | | | |
|---|---|---|---|
| 625947 | 8/1961 | Canada | 55/16 |
| 1017637 | 1/1966 | United Kingdom | 55/16 |

*Primary Examiner*—Robert H. Spitzer
*Attorney, Agent, or Firm*—Sidney W. Millard

[57] ABSTRACT

A gas which is the most readily condensable of the gases of a mixture is separated by passing the mixture in contact with at least one microporous barrier having a permeability of $100 \times 10^{-7}$ to $1000 \times 10^{-7}$ moles of air/cm$^2$/min./cmHg, a pore thickness of 10 to 100 Å, by adjusting the partial pressure of the most readily condensable gas and/or the temperature of the gas mixture as a function of the mean pore radius of the barrier in order to ensure capillary condensation of the condensable gas at the pore inlets of the barrier and to induce a flow of condensed gas along the pores and across the barrier, the gas which has thus condensed being then collected.

5 Claims, 1 Drawing Figure

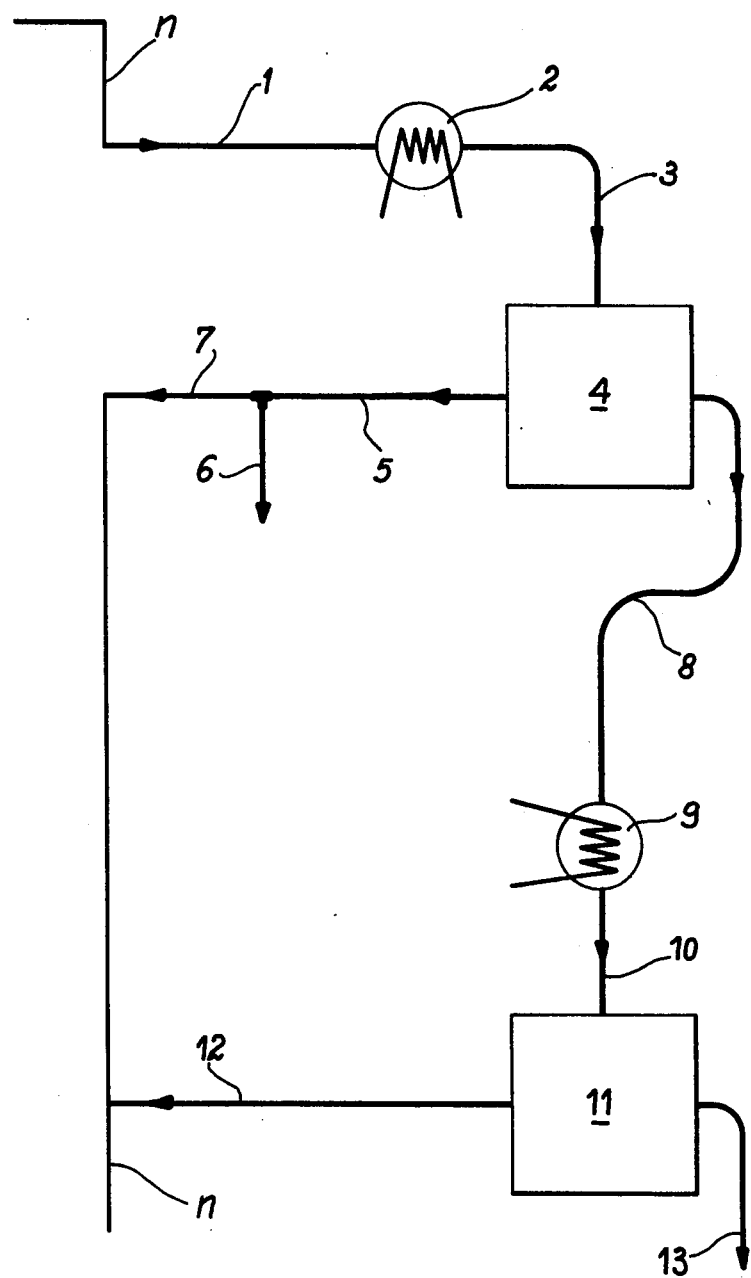

METHOD OF SEPARATION OF A GAS FROM A GAS MIXTURE

This invention relates to a method of separation of a gas from a gas mixture as applicable in particular to the purification of uranium hexafluoride derived from an isotopic enrichment plant.

It is known that, in the petrochemical industry, problems often have to be solved in regard to the separation of gas mixtures. For example at the outlet of a gas-phase synthesis reactor, it may be required to collect the synthesis gas and to recover the reaction gases which have not reacted in order to recycle these latter in another reactor together with a make-up or supplement gas. It may also be necessary to carry out purification or concentration of a gas in a synthetic or natural mixture. In order to separate gas mixtures of this type, known separation processes include the following:

condensation: the gas mixture is cooled in heat exchangers and in atmospheric coolants, then in partial condensers, absorption: the mixture is cooled and selectively absorbed on molecular sieves, dissolution: the mixture is cooled and selectively dissolved in suitable solvents.

These processes are subject to disadvantages from an economic standpoint since they are costly and presuppose considerable capital investments; moreover, from a thermodynamic point of view, they call for the use of a large amount of mechanical or heating energy.

In regard to the purification of uranium hexafluoride delivered by an isotopic enrichment plant, it is known that uranium hexafluoride contains a certain number of impurities such as $F_2$, $ClF_3$, HF, ClF, $N_2$, etc.

The separation of $UF_6$ from these light gases is usually performed by methods such as:

crystallization: the gas mixture is cooled in heat exchangers or crystallizers, thus resulting in crystallization of the $UF_6$. It is necessary to have banks of these crystallizers in series in order to prevent trapping of the light gases at the time of excessively rapid formation of $UF_6$ crystals and at the same time in order to permit of continuous purification. The different steps of cooling, reheating and vaporization which are necessary consume energy and leave the gases and vapors in contact with each other over long periods of time;

distillation: this process is continuous but is fairly difficult to control and problems arise from the need to handle the overheated corrosive liquids which are present in this case;

the use of cascade-connected gaseous diffusion barriers: this process makes it possible to obtain fairly high separation factors but entails considerable power consumption without thereby permitting complete separation.

In order to separate a binary gas mixture, especially a mixture of hydrogen and sulphur dioxide, it has also been endeavored to utilize the phenomenon of capillary condensation in the vicinity of a porous mass of graphite powder by modifying the conditions of temperature and pressure. This method did not prove satisfactory, however, since the graphite powder employed did not really make it possible to obtain an appreciable continuous flow of the sulphur dioxide through its mass and did not really constitute a physical barrier for the hydrogen of the mixture.

The precise object of the present invention is to provide a method of separation of a gas from a gas mixture which overcomes the disadvantages of all the methods recalled in the foregoing and makes it possible to obtain a continuous and efficient separation of the gases which are present.

The method according to the invention for the separation of a gas from a gas mixture in which said gas is the most readily condensable of the gases of the mixture essentially consists in passing said gas mixture in contact with at least one microporous barrier having a permeability between $100 \times 10^{-7}$ to $1000 \times 10^{-7}$ moles of air/cm$^2$/min./cmHg, a thickness between a few microns and a few tens of microns and pore radii between 10 and 100 Å; the partial pressure of said most readily condensable gas and/or the temperature of said gas mixture is adjusted as a function of the mean pore radius of said barrier in order to ensure capillary condensation of said most readily condensable gas at the pore inlets of said barrier and a flow of said condensed gas along the pores and across said barrier and said gas which has thus condensed is then collected.

In accordance with the invention, the microporous barriers are of metal, of ceramic material or of fluorinated polymer. The unit of permeability of these microporous elements as expressed in moles of air/cm$^2$/min/cmHg means that x moles of air pass at a temperature of 20° C. per cm$^2$ of microporous element surface area per minute and in respect of a pressure difference of 1 cmHg between the exterior and the interior of the microporous element.

The phenomenon of capillary condensation employed in the method according to the invention is carried into effect in accordance with Kelvin's law:

$$\text{Log} \frac{P_v}{P} \leq \frac{\sigma \cdot M}{\rho_L \cdot R \cdot T \cdot m}$$

wherein:
$P_v$ = saturated vapor pressure at the temperature T,
P = partial vapor pressure in the mixture,
$\sigma$ = surface tension of the condensate,
M = molar mass of the condensate,
$\rho_L$ = specific volume of the condensate,
R = ideal gas constant,
m = radius of curvature of the meniscus.

It is recalled that the radius of curvature m of the meniscus of the condensate as given by the Kelvin relation and the corresponding pore radius $\gamma_p$ assumed to be cylindrical are related by the following relation:

$$m = \frac{\gamma_p}{2 \cos \theta}$$

where $\theta$ corresponds to the angle of contact of the condensate with the wall of the pore. This relation clearly points to the importance of wettability of the condensate with respect to the material which constitutes the barriers.

The nature of the microporous barriers employed in accordance with the method of the invention as well as their characteristics (permeability, thickness, pore radius) make it possible to obtain a continuous and selective flow of the most readily condensable gas and therefore efficient separation. In fact, the pores of the microporous layer are completely obstructed by the condensate and thus constitute a barrier for the other gases which are noncondensable or less readily condensable than the first gas.

The application of the method in accordance with the invention to the purification of uranium hexafluoride obtained from an isotopic separation plant is particularly advantageous. In fact, uranium hexafluoride is far more readily condensable than the other gases constituting impurities which accompany $UF_6$ at the outlet of an isotopic enrichment plant. Thus, in accordance with the method of the invention, the pores of the microporous layer are rapidly clogged by the condensed uranium hexafluoride and form a barrier for the other gases which constitute the impurities. Moreover, by virtue of the method according to the invention, the contacting time between the condensed liquid and the mixture to be separated is reduced to a very considerable extent: the possibilities of dissolution of the other gases in liquid $UF_6$ are in that case very limited. The rates of permeation in accordance with the method of the invention are considerably higher than those obtained when $UF_6$ is purified by gaseous diffusion. Thus the ratio is between 5 and 10 according to the microporous element employed.

In order to ensure efficacious purification of $UF_6$ in accordance with the method of the invention, steps are taken to ensure that the mixture is entirely and continuously homogeneous and that the conditions of partial pressure of $UF_6$ are uniform throughout the length of the microporous element employed.

By way of example and without any limitation being implied, the description given below relates to the practical application of the method in accordance with the invention to the purification of uranium hexafluoride derived from an isotopic enrichment plant.

The accompanying FIGURE is a diagrammatic illustration of the device for carrying out the method contemplated in the present application.

A mixture of $UF_6$ and $ClF_3$ is withdrawn through the duct 1 at a rate of 2500 g/s at the level of the stage n of an isotopic enrichment plant at the point corresponding to the highest pressure. The proportions of the mixture are 7.1 moles of $UF_6$ for 0.11 mole of $ClF_3$. The pressure is 1500 millibars and the temperature is higher than 100° C.

This mixture is passed into a heat exchanger 2 and cooled therein to a temperature of 90° C., then passed through the duct 3 into the diffuser 4 which comprises 540 microporous barriers.

At the outlet of said diffuser 4, practically pure $UF_6$ is delivered through the pipe 5 at a flow rate of 2400 g/s, namely 6.95 moles/second of $UF_6$; the temperature is 90° C. and the pressure is 275 millibars. This uranium hexafluoride is sufficiently free of impurities to permit withdrawal at 6 of the quantity desired for production and to reintroduce the remainder at 7 for feeding back to the stage n of the enrichment plant at a point corresponding to the lowest pressure.

At the outlet of the diffuser 4, a mixture of $UF_6$ and $ClF_3$ is obtained through the duct 8 in proportions of 0.13 mole of $UF_6$ in respect of 0.11 mole of $ClF_3$; the temperature is 90° C. and the pressure is 1450 millibars.

This mixture is cooled to a temperature of 75° C. by passing through the heat exchanger 9, then introduced through the duct 10 into the diffuser 11 which is constituted by 50 microporous barriers.

At the outlet of said diffuser 11, practically pure $UF_6$ is obtained through the duct 12 at a flow rate of 35 g/s, namely 0.10 mole/s of $UF_6$; the temperature is 75° C., the pressure is 275 millibars. It is possible either to effect a further withdrawal of said uranium hexafluoride for production or to reintroduce this latter into the stage n of the enrichment plant at a point corresponding to low pressure.

At the outlet of the diffuser 11, a mixture of $ClF_3$ and uranium hexafluoride is obtained through the duct 13 in proportion of 0.11 mole of $ClF_3$ in respect of 0.03 mole of $UF_6$; the temperature is 75° C., the pressure is 1400 millibars. This final mixture which therefore contains approximately 20% $UF_6$ and 80% $ClF_3$ can either be discharged or undergo further separation by means of conventional methods such as condensation or undergo further separation by means of the method in accordance with the invention.

The barriers of the diffuser 4 and of the diffuser 11 are tubular barriers of ceramic material and have a diameter of 1.5 cm, a pore radius of 25 Å and a sweep length of 1 m. The barriers are placed in parallel in each diffuser. Barriers having the same dimensions and either metallic or of fluorinated polymer have also been employed with comparable results.

By way of comparison, it can be noted that separation of the same mixture by means of the conventional method of gaseous diffusion would entail the need for approximately twenty stages and that each stage calls for a compression of the entire flow and approximately five times the number of barriers per diffuser.

Compared with the conventional methods of separation by crystallization steps, the method in accordance with the invention offers the following advantages:
  the products are available at pressures which can be directly utilized either for production or for recycling in the cascade;
  the set of two diffusers replaces the first bank of crystallizers and has the further advantage of dispensing with the need for an evaporator;
  in the method according to the invention, approximately $35 \times 10^3$ kcal/h are required for cooling purposes whereas $100 \times 10^3$ kcal/h are necessary for cooling in accordance with the crystallizer process;
  the process is continuous and avoids the need for storages of crystallized products.

What we claim is:

1. A method of separation of a gas from a gas mixture in which said gas is the most readily condensable of the gases of said mixture, wherein said gas mixture is passed in contact with at least one microporous barrier having a permeability of $100 \times 10^{-7}$ to $1000 \times 10^{-7}$ moles of air/cm$^2$/min./cmHg, a pore radii of between 10 to 100 A, the partial pressure of said most readily condensable gas and/or the temperature of said gas mixture is adjusted as a function of the mean pore radius of said barrier so as to ensure capillary condensation of said condensable gas at the pore inlets of said barrier and to induce a flow of said condensed gas along to pores and across said barrier, and the gas which has thus condensed is then collected.

2. A method according to claim 1, wherein the barrier or barriers are of ceramic material.

3. A method according to claim 1, wherein the barrier or barriers are of metal.

4. A method according to claim 1, wherein the barrier or barriers are of fluorinated polymer.

5. The application of the method according to any one of claims 1 to 4 to the purification of uranium hexafluoride derived from an isotopic enrichment plant.

* * * * *

UNITED STATES PATENT AND TRADEMARK OFFICE
CERTIFICATE OF CORRECTION

PATENT NO. : 4,239,507
DATED : December 16, 1980
INVENTOR(S) : Robert Benoit, et al.

It is certified that error appears in the above-identified patent and that said Letters Patent are hereby corrected as shown below:

On the title page, Item [73] should read:
--- COMMISSARIAT A L'ENERGIE ANTOMIQUE, Paris, France ---.

Signed and Sealed this

Third Day of November 1981

[SEAL]

Attest:

Attesting Officer

GERALD J. MOSSINGHOFF

Commissioner of Patents and Trademarks